United States Patent [19]

Blackledge, Jr. et al.

[11] Patent Number: 5,432,939
[45] Date of Patent: Jul. 11, 1995

[54] TRUSTED PERSONAL COMPUTER SYSTEM WITH MANAGEMENT CONTROL OVER INITIAL PROGRAM LOADING

[75] Inventors: John W. Blackledge, Jr.; Richard A. Dayan; Dennis L. Moeller; Palmer E. Newman; Kenneth J. P. Zubay, all of Boca Raton, Fla.

[73] Assignee: International Business Machines Corp., Armonk, N.Y.

[21] Appl. No.: 889,324

[22] Filed: May 27, 1992

[51] Int. Cl.⁶ .............................................. G06F 9/44
[52] U.S. Cl. ................................. 395/700; 395/575; 364/DIG. 1; 364/280; 364/280.9; 364/280.2; 364/286.4
[58] Field of Search ........................ 395/650, 700, 800

[56] References Cited

U.S. PATENT DOCUMENTS

| | | | |
|---|---|---|---|
| 5,022,077 | 6/1991 | Bealkowski et al. | 380/4 |
| 5,128,995 | 7/1992 | Arnold et al. | 380/4 |
| 5,136,713 | 8/1992 | Bealkowsky et al. | 395/700 |
| 5,230,052 | 7/1993 | Dayan et al. | 395/700 |
| 5,274,816 | 12/1993 | Oka | 395/700 |

Primary Examiner—Kevin A. Kriess
Attorney, Agent, or Firm—Daniel E. McConnell

[57] ABSTRACT

This invention relates to personal computer systems and, more particularly, to such a system having security features enabling control over access to data retained in such a system. The features here described include a prioritized initial loading program for enabling initial loading of an operating system from a selected one of a plurality of sources, the prioritized initial loading program normally designating an interpreter program as a final option default in the event of failure of access to an operating system from any other one of the plurality of sources; a security utility program for enabling a designated user to (a) selectively modify the initial loading program by specifying the number and priority order of the plurality of sources and (b) selectively modify the initial loading program by deleting the interpreter program from the plurality of sources; a master cryptographic key for use in encrypting and decrypting data processed by the system CPU; and a second security utility program for enabling a designated user to modify the master cryptographic key.

7 Claims, 4 Drawing Sheets

TRUSTED PERSONAL COMPUTER SYSTEM WITH MANAGEMENT CONTROL OVER INITIAL PROGRAM LOADING

TECHNICAL FIELD

This invention relates to personal computer systems and, more particularly, to such a system having security features enabling control over access to data retained in such a system.

BACKGROUND TO THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar or planar) to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 35, 40, L40SX, 50, 55, 56, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 57 through 95. Early Family I models typically used the popular INTEL 8088 or 8086 microprocessor as the system processor. Certain later Family I and the Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provides hardware compatibility with software written for the 8086 and 8088 microprocessors.

With the phenomenal growth and use of personal computers in the world in recent years, more and more data or information is being collected and retained or stored in such systems. A lot of this data is sensitive in nature. In the wrong hands, data could become embarrassing to individuals, a company could lose a competitive edge, or sensitive data could be used to force payment for silence or lead to physical violence against individuals. As more users recognize the sensitive nature of data and its value, the more it becomes desirable to protect against such misuse. To protect themselves and the persons associated with the stored data, users are requiring incorporation of security and integrity features into the personal computers that they purchase.

Users are not the only people to recognize the sensitivity of the data being collected and stored. Governments are also enacting laws to enforce protection of sensitive data. One such government is that of the United States. It has recognized and responded to the gravity of the situation. The United States federal government has defined security levels and the associated requirements it takes to meet those levels, and provides a certification agency for personal computer manufacturers to submit products in order to see if the products meet the security level claimed by the manufacturer. The source for the Federal Requirements is the Department of Defense, Trusted Computer System Evaluation Criteria, DOD 5200.28 STD, 12/85, generally referred to as The Orange Book. The government has legislated that by Jan. 1, 1992 all data related to the government must only be processed and stored on personal computers with a minimum security level of C-2. For computer system hardware, the essence of the requirements is contained in the Assurance section, Requirement 6: "trusted mechanisms must be continuously protected against tampering and/or unauthorized changes ..."

Beginning with the earliest personal computer system of the Family I models, such as the IBM Personal Computer, it was recognized that software compatibility would be of utmost importance. In order to achieve this goal, an insulation layer of system resident code, also known as "firmware", was established between the hardware and software. This firmware provided an operational interface between a user's application program/operating system and the device to relieve the user of the concern about the characteristics of hardware devices. Eventually, the code developed into a Basic Input/Output System (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system.

For instance, with the introduction of the IBM Personal System/2 with Micro Channel architecture, a significantly new BIOS, known as advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT, only 32K bytes of ROM were resident on the planar board. Fortunately, the system could be expanded to 96K bytes of ROM. Unfortunately, because of system constraints, this turned out to be the maximum capacity available for BIOS. Luckily, even with the addition of ABIOS, ABIOS and CBIOS could still squeeze into 96K of ROM. However, only a small percentage of the 96K ROM area remained available for expansion. It has been believed that, with the addition of future I/O devices, CBIOS and ABIOS will eventually run out of ROM space. Thus, new I/O technology will not be able to be easily integrated within CBIOS and ABIOS.

Due to these problems, plus the desire to make modifications in Family II BIOS as late as possible in the development cycle, it became necessary to offload portions of BIOS from the ROM. This was accomplished by storing portions of BIOS on a mass storage device such as a fixed disk, preferably in a defined portion of such a disk known as a system partition. The system partition also stores an image of a system reference diskette, which includes certain utility programs used in establishing system configuration and the like. Since a disk provides writing as well as reading capabilities, it became feasible to modify the actual BIOS code on the disk. The disk, while providing a fast and efficient way to store BIOS code, nevertheless greatly increased the probability of the BIOS code being corrupted. Since BIOS is an integral part of the operating system, a corrupt BIOS could lead to devastating results and in many cases to complete failure and non-operation of the system. Thus, it became quite apparent that a means for preventing unauthorized modification of the BIOS code on the fixed disk was highly desirable. This was the subject matter of U.S. patent application Ser. No. 07/398,820, filed Aug. 25, 1989, and now U.S. Pat. No. 5,022,077 issued 4 Jun. 1991. The interested reader is referred to that patent for additional information possibly helpful in understanding of the invention here disclosed, and the disclosure of that patent is hereby incorporated by reference into this specification to any extent necessary to a full understanding of the inventions here disclosed.

With the introduction of IBM's PS/2 Micro Channel Systems came the removal of switches and jumpers from I/O adapter cards and planar. The Micro Channel Architecture provided for programmable registers to replace them. Utilities to configure these programmable registers or programmable option select (POS) registers were required. These, and other utilities to improve system usability characteristics along with system diagnostics, were shipped with each system on a system reference diskette.

Prior to initial use, each Micro Channel System requires that its POS registers be initialized. For example, if the system is booted with a new I/O card, or a slot change for an I/O card, a configuration error is generated and the system boot up procedure halts. The user is then prompted to load the system reference diskette and press the F1 key. A "Set Configuration Utility" can then be booted from the system reference diskette to configure the system. The Set Configuration Utility will prompt the user for the desired action. If the appropriate I/O card's descriptor files are loaded on the system reference diskette, the Set Configuration Utility will generate the correct POS or configuration data in non-volatile storage. The descriptor file contains configuration information to interface the card to the system.

BRIEF DESCRIPTION OF THE INVENTION

With the foregoing in mind, the present invention provides management tools for a system owner or authorized user to assure that a personal computer system is properly secure against access by an attacker knowledgeable about certain heretofore usual characteristics of personal computer systems, while retaining for a system which is not to be secured those characteristics which have become known to knowledgeable users. In particular, the present invention addresses foreclosing the availability of an interpreter program otherwise possibly available for direct entry of commands which might enable a knowledgeable user to penetrate an otherwise secured personal computer system.

Similarly, the present invention addresses protecting a master cryptographic key retained in memory of the personal computer system.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

Figure 1:
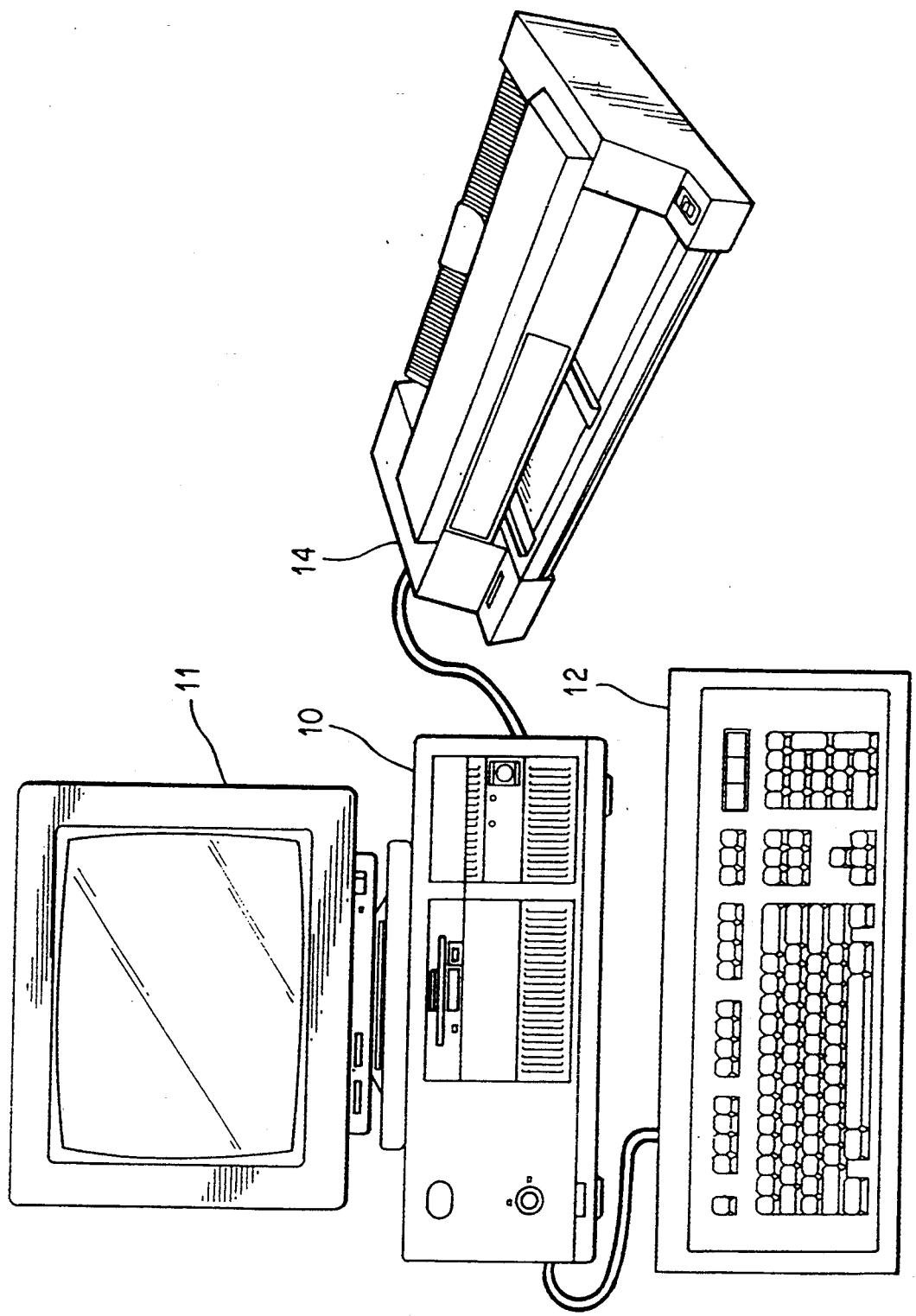
FIG. 1 is a perspective view of a personal computer embodying this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Certain defined terms may be used herein, as follows:

TRUSTED COMPUTING BASE (TCB): The totality of protection mechanisms within a computer system—including hardware, firmware and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g. a user's clearance) related to the security policy.

TRUSTED SOFTWARE: The software portion of a Trusted Computing Base.

TRUSTED PROGRAM: A program included in Trusted Software.

OPEN PROGRAM: A program operable on a Trusted Computing Base and which is other than a Trusted Program.

REFERENCE MONITOR CONCEPT: An access control concept that refers to an abstract machine that mediates all accesses to objects by subjects.

SECURITY KERNEL: The hardware, firmware and software elements of a Trusted Computing Base that implement the reference monitor concept. It must mediate all accesses, be protected from modification and be verifiable as correct.

TRUSTED COMPUTER SYSTEM: A system that employs sufficient hardware and software integrity measures to allow its use for processing simultaneously a range of sensitive or classified information.

SYSTEM OWNER: The system owner is the user who is responsible for configuring and placing a system in secure mode initially. The system owner will control configuration both initially and whenever an update needs to be made. This person will control the Privileged Access Password and be responsible for maintaining its integrity. The system owner will also maintain physical security of the tamper evident cover keylock key. The system owner will be responsible for maintaining security logs on all systems. The system owner will also have to record all attempted security breaches. The system owner may own more than one system. The system owner is considered an authorized user and can also be a normal user.

SECURE MODE: When a system owner has successfully installed the Privileged Access Password on a personal computer system to invoke security protection provided by the security and integrity elements.

AUTHORIZED USER: Any user who is given permission to use the Privileged Access Password. This person may or may not be the system owner. This person may also have a key for a particular system or a set of systems. If this person is involved in recovering a system from a security breach, they are responsible for reporting it to the system owner. An authorized user may also be a normal user.

NORMAL USER: Any user of a system authorized to use the system facilities. In order to change a system configuration or fix a problem, this user requires the assistance of either the system owner or an authorized user. The normal user does not have the Privileged Access Password or the tamper evident cover keylock key unless they belong to either the authorized user or system owner category.

UNAUTHORIZED USER: Any one not defined as a system owner, authorized user or normal user. Any use or modification of a secured personal computer system by an unauthorized user is considered a security breach, other than an unsuccessful power on, and an audit trail must exist showing such breaches.

EEPROM: Electrically Erasable Programmable Read Only Memory. This memory technology provides for non-volatile storage of data that can be changed under control of hardware logic. Contents of storage is not lost when power is absent. Contents may be altered only when the appropriate controls signals on the module are activated in the predefined sequence.

PASSWORD DESCRIPTION: The system has the potential to be protected by two passwords: 1. Privileged Access Password (PAP) and 2. Power On Password (POP). These passwords are intended to be used independently of one another. The PAP is designed to provide protection for the system owner by protecting the Initial Program Load (IPL) device boot list, access to the password utility, and access to the System Reference Diskette or System Partition. The System Partition will only be booted in response to a POST error (or on a warm boot) if there is no PAP installed or the PAP was entered initially during the power on sequence. Initial BIOS Load (IBL) from a diskette will be secured in the same manner as booting the System Reference Diskette. The existence of the PAP will be transparent to a normal user using the POP. The PAP will be installed, changed, or deleted by a utility on the System Reference Diskette or in the System Partition. The PAP, when set and entered correctly, will give the owner access to the entire system, overriding the POP. The POP, working as on all current PS/2 systems, is used to prevent any unauthorized access to the Operating System on the DASD or the facilities of the system.

Figure 2:
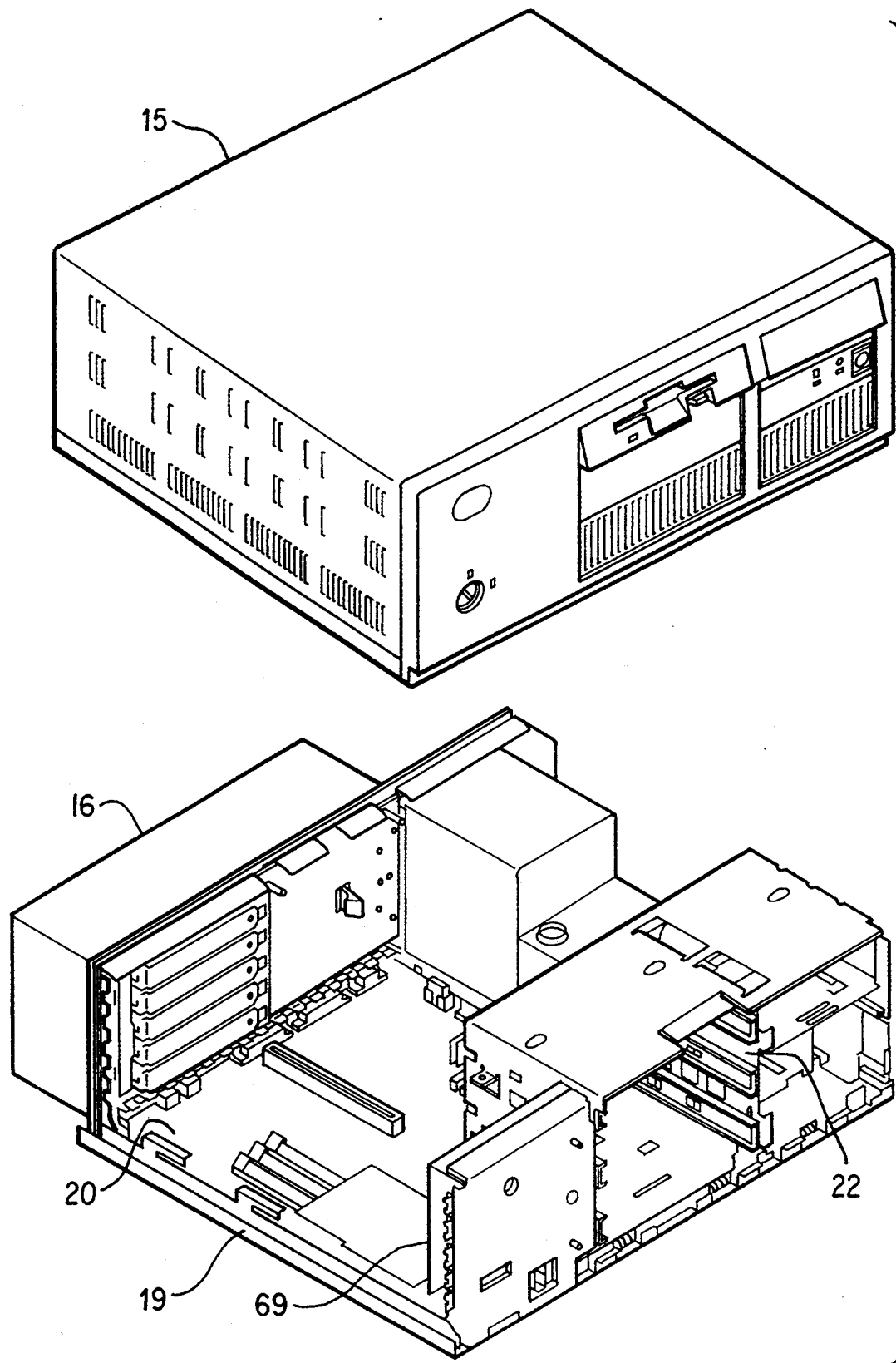
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. In the form illustrated in FIG. 2, the computer 10 also has an optional I/O cable connection cover 16 which extends over and protects the connection points of I/O cables with the computer system. At least certain of the system components are mounted on a multilayer planar 20 (also described herein as a motherboard or system board) which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2, and which may be covered externally by the cable connection cover 16) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
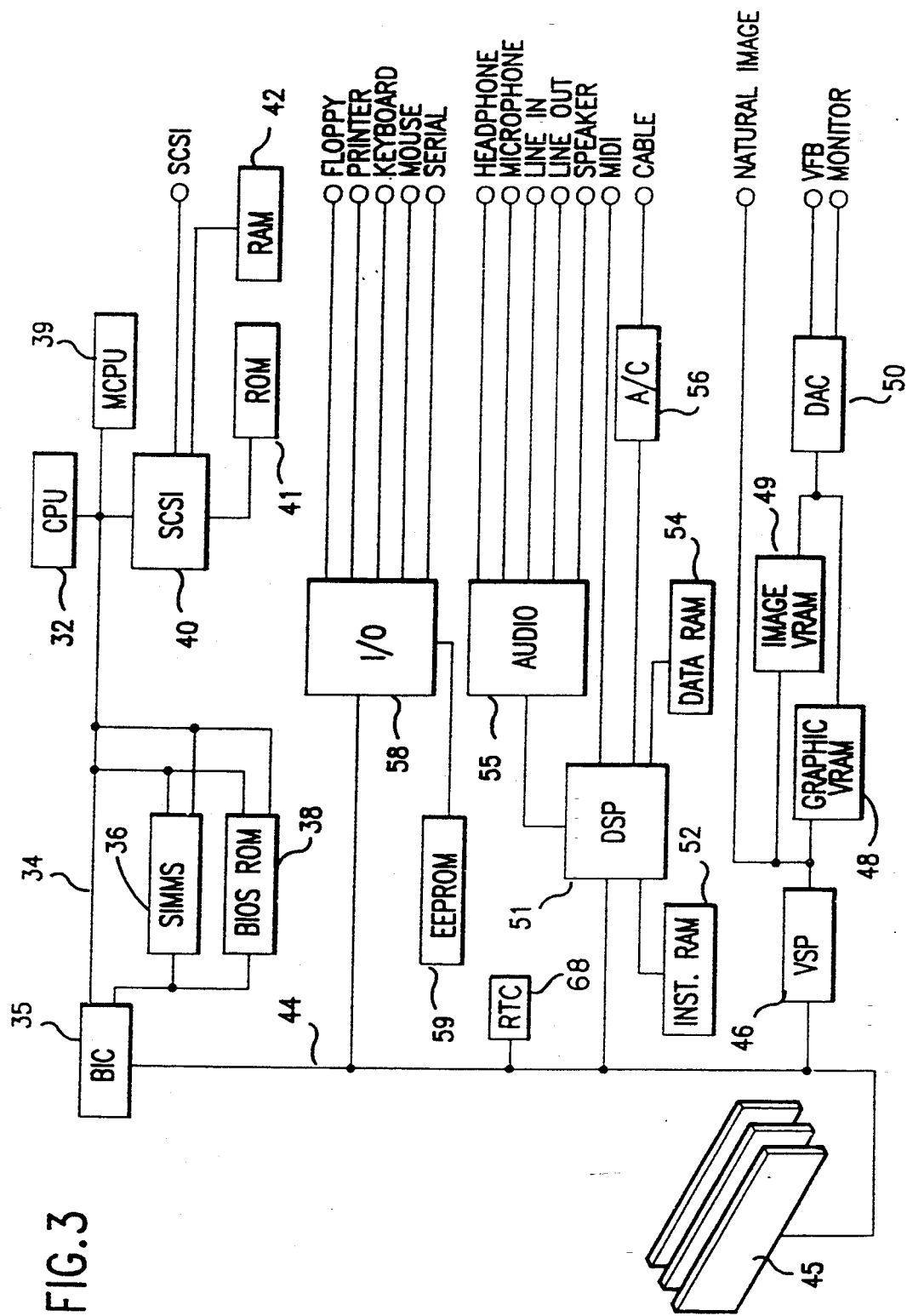
FIG. 3 is a schematic view of certain components of the personal computer of FIGS. 1 and 2.
Figure 4:
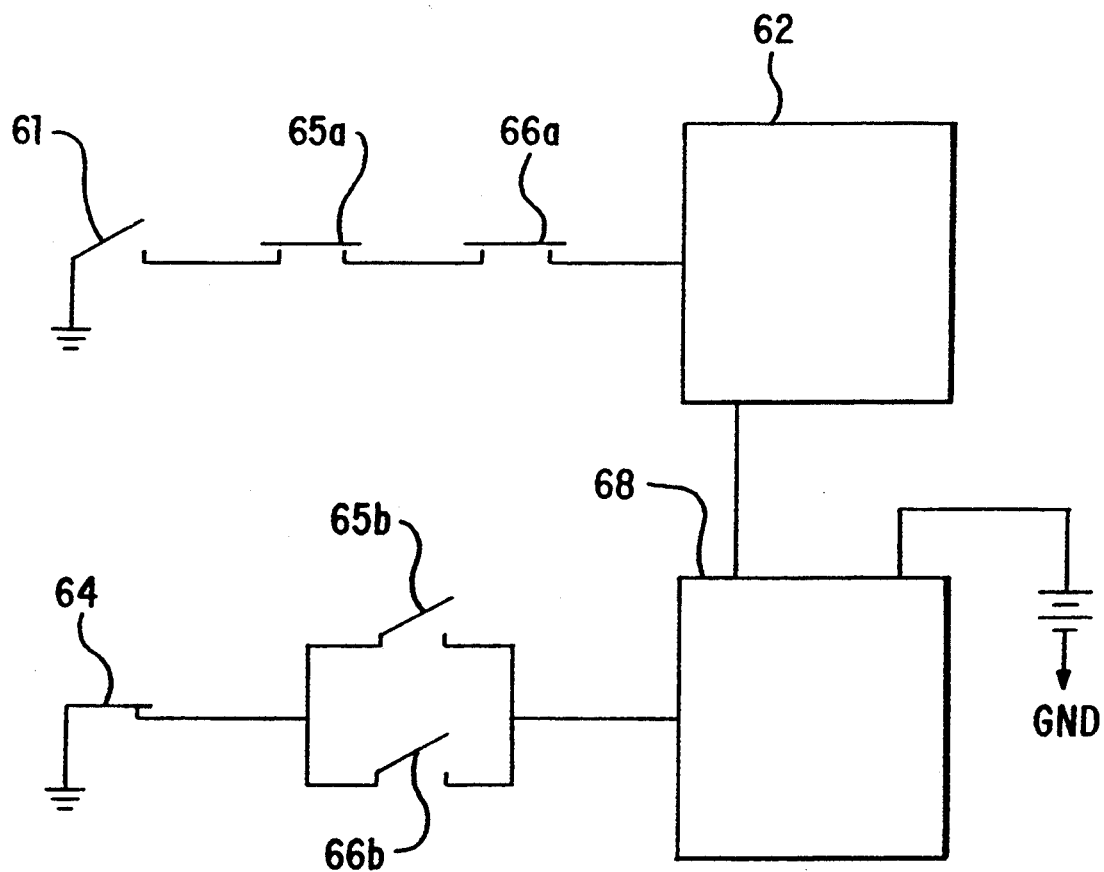
FIG. 4 is a schematic representation of certain components of the personal computer of FIGS. 1 and 2 which are related to the security features of the present invention.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. The ROM 38 also has an interpreter program stored therein for enabling interpretation of and operation of the CPU 32 in response to direct entry of commands by a user of the personal computer system. Heretofore, the interpreter program has typically accepted keyboard entry of characters and been capable of interpreting beginner's all-purpose symbolic instruction code (BASIC), although it is contemplated that other forms of command entry and possibly other codes may be used. For examples, entry of commands may be by a voice recognition audio input system or a pen based handwriting or touch point input system. For purposes of this disclosure, all such input devices are identified as "user input devices" and the computer recognizable inputs are identified as "commands". Instructions stored in the BIOS ROM 38 can be copied into RAM 36 to decrease the execution time of BIOS. The system also has, as has become conventional, a circuit component which has battery backed non-volatile memory (conventionally CMOS RAM) for receiving and retaining data regarding the system configuration and a real time clock (RTC) 68 (FIGS. 3 and 4).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices. At least one such storage device, in accordance with this invention, is a mass storage device mounted within the system enclosure and inaccessible for user removal, with this particularly identified mass storage device having a system partition and being operatively connected with the CPU 32 for storage of programs and data in and retrieval of programs and data from the mass storage device. The significance of the device having a system partition has been addressed briefly hereinabove. The significance of the device being user inaccessible is that it is protected by the system security features from physical access for tampering or removal and replacement.

As has been described in previously filed applications held by the owner of the invention here described, the process of bringing a personal computer into operation progresses through a series of steps which have been identified by particular terminology which has come to have meaning generally understood by persons skilled in the relevant arts. Thus the person of skill will understand the meanings of POST (Power On Self Test); IML (Initial Machine Load); and IPL (Initial Program Load). POST calls IML which calls IPL which loads an operating system for the personal computer system which is being brought into operation. Portions of POST, IML and IPL may be distributed among the ROM 38 and system partition described above. IML loads into a designated area of RAM (here, SIMMS 36) an image of a run time BIOS, an interpreter program as herein described, and certain portions of POST. IPL loads a designated operating system from a source identified on a prioritized list supplied by the system owner. This last identified function is here identified as a prioritized initial loading program.

Commonly, the initial loading program is stored in the system partition of the mass storage device for enabling initial loading of an operating system from a selected one of a plurality of sources including (for example) any bootable mass storage device or diskette mounted in a floppy disk drive, the system partition of the mass storage device, and any reference diskette in place in a floppy disc drive of the system 10. The prioritized initial loading program normally designates the BASIC interpreter program stored in ROM 38 or loaded into RAM as a final option default in the event of failure of access to an operating system from any other one of such a plurality of sources.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with an associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), other multi-media input device (not shown), and by means of a serial port. The EEPROM plays a part in certain security provisions described hereinafter and in co-pending U.S. patent application Ser. No. 840,965 filed 26 Feb. 1992 and entitled "Personal Computer System with Security Features and Method". To any extent necessary or appropriate to a full understanding of the invention here described, that co-pending application is hereby incorporated by reference into this application. In any event, the interested reader is referred to that co-pending application for a further discussion of layered password protection.

In achieving certain objectives of securing a personal computer system as described herein, the personal computer system 10 has an erasable memory element mounted within the system enclosure for selective activation to active and inactive states and for receiving and storing a privileged access password (defined more fully hereinafter) when in the active state. The erasable memory element preferably is at least one field or portion of the electrically erasable programmable read only memory device or EEPROM 59 (FIG. 3) described above. The system also has an option or security switch mounted within the enclosure and operatively connected with the erasable memory element 59 for setting the used field or portion of that memory element to the active and inactive states. The option switch (also called security switch in this disclosure) may be, for example, a jumper mounted on the system planar 20 and manually settable to two different states by a person having access to the planar. In one state (also mentioned herein as the write enable or unlocked state), the EEPROM 59 is set to be active and to store a PAP as described herein. In the write enable state, the PAP may be written to the EEPROM, changed or removed. In the other or inactive state (also mentioned herein as the write disabled or locked state), the PAP storage capability of the EEPROM is set to be inactive.

As mentioned above, the system 10 also has a second component having erasable memory capabilities, namely battery supported, non-volatile CMOS RAM and an associated real time clock (RTC), indicated at 68. The CMOS RAM stores data indicative of the system configuration including, in accordance with this invention, data regarding the successful entry of the PAP on power up of the system 10. At least one tamper detection switch is provided, mounted within the enclosure and operatively connected with the CMOS RAM for detecting opening of the enclosure and for clearing or setting certain data stored in that memory element in response to any switching of the tamper detection switch.

The security and integrity features described above and hereinafter work independently of a previously offered personal computer security feature, the Power on Password (POP). These additional security and integrity features provide a secure platform for operating system certification under applicable regulations such as the Orange Book. An additional password is required to place the system in secure mode. The new password is here referred to as the Privileged Access Password (PAP). To maintain compatibility with previous personal computer systems, the POP is still supported.

Password Security is implemented by system hardware features: an EEPROM, a security switch and a tamper evident cover switch, firmware, POST and the system software password utility. Once the PAP has been installed, the system is in secure mode. The PAP is saved in the EEPROM. A backup copy of the PAP is also maintained in the EEPROM. This is done to prevent accidental loss of the PAP when a power failure occurs during the installation, change, or removal of the PAP. The POP and at least certain bits indicative of the validity of the PAP (if installed) are stored in the CMOS RTC. Changes in data retained in the CMOS RTC and in the EEPROM are independent one from the other.

Two bits in the EEPROM are used as a state machine that lets POST know exactly where a power outage occurred in the update sequence and, if possible, recover from a system board replacement situation. The password utility maintains the update indicator field, a two bit state machine used during any access to the PAP. If a power outage occurred during the password modification, when power is restored POST checks the state machine (POST actually checks the state machine on all power ups.) If the PAP is updated successfully (a '00' state), POST proceeds in the normal manner. If the update has started before power is lost (a '01' state), POST will check for the presence of a valid backup PAP. If valid, POST copies the backup PAP into the storage for the primary PAP. If the option or security switch is not in the unlocked or write enable position an error will be displayed. The system owner will have to intervene by unlocking the covers and changing the position of the security switch. If the primary PAP has been updated successfully (a '10' state), POST will use the primary PAP (the new PAP) to validate any attempts to use the system reference diskette or boot the system partition. POST will assume the backup PAP is invalid. POST will copy the primary PAP to the backup PAP in this case.

If the backup PAP has been updated successfully (a '11' state), both the primary and backup PAP are considered valid and POST will verify the validity of the Primary PAP, prior to confirming the entry of the PAP by the user.

In accordance with the security features to which the present disclosure is particularly directed, a security utility program is stored in the system partition of the mass storage device inaccessibly to either of a normal user and an unauthorized user of the personal computer system for enabling one of a system owner and an authorized user to (a) selectively modify the aforementioned prioritized initial loading program by specifying the number and priority order of the group of a plurality of initial program load (IPL) sources and (b) selectively modify the prioritized initial loading program by deleting the BASIC interpreter program stored in ROM 38 from the group of IPL sources. A master cryptographic key is provided, in the form of data stored at a location in the personal computer system 10 for use in encrypting and decrypting data processed by the CPU 32 under the control of security encoding programs. The master cryptographic key, which will preferably be unique to a specific system 10, is typically accessed and used in conjunction with individual, personal cryptographic key assigned to or selected by authorized users. The presence of layered cryptographic keys assures secure control over access to encoded files maintained on a trusted computer base as herein described.

Where a master cryptographic key is provided, a second security utility program is stored in the system partition of the mass storage device for enabling one of a system owner and an authorized user to modify the master cryptographic key data.

In the drawings and specifications there has been set forth a preferred embodiment of the invention and, although specific terms are used, the description thus given uses terminology in a generic and descriptive sense only and not for purposes of limitation.

What is claimed is:

1. A personal computer system for receiving and retaining data and capable of securing data retained within the system against unauthorized access, the system comprising:
a keyboard for user entry of characters,
a normally closed enclosure,
a system processor mounted within said enclosure and operatively connected with said keyboard, said system processor for executing programs and processing data during operation of the personal computer system,
a read only memory (ROM) device mounted within said enclosure and operatively connected with said system processor for storing programs for operation of the personal computer system,
an interpreter program stored in said ROM device for enabling interpretation of keyboard entry of characters by a user of the personal computer system,
said system processor when executing said interpreter program functioning in response to keyboard entry of characters by a user of the personal computer system,
a mass storage device mounted within said enclosure and inaccessible for user removal, said mass storage device having a system partition and being operatively connected with said system processor for storage of programs and data in and retrieval of programs and data from said mass storage device,
a prioritized initial loading program stored in said system partition of said mass storage device for enabling initial loading of a basic input/output system (BIOS) program from a selected one of a plurality of sources including said ROM device, said prioritized initial loading program normally designating said interpreter program as a final option default in the event of failure of access to a BIOS program from any other one of said plurality of sources,
said system processor when executing said prioritized initial loading program loading a basic input/output system program from a selected one of a plurality of sources including said ROM device,
a security utility program stored in said system partition of said mass storage device for enabling one of a system owner and an authorized user to selectively modify said prioritized initial loading program by deleting said interpreter program from the group of said plurality of sources, and
said system processor when executing said security utility program enabling one of a system owner and an authorized user to selectively modify said prioritized initial loading program by deleting said interpreter program from the group of said plurality of sources.

2. A personal computer system according to claim 1 wherein said system processor when executing said security utility program enables one of a system owner and an authorized user to selectively modify said prioritized initial loading program by specifying the number and priority order of the group of said plurality of sources.

3. A personal computer system according to claim 1 wherein said security utility program is inaccessible to either of a normal user and an unauthorized user of the personal computer system.

4. A personal computer system according to claim 1 wherein said interpreter program is an interpreter for beginner's all-purpose symbolic instruction code (BASIC).

5. A personal computer system according to claim 1 further comprising master cryptographic key data stored in said personal computer system for use in encrypting and decrypting data processed by said system processor, and a second security utility program stored in said system partition of said mass storage device for enabling one of a system owner and an authorized user to modify said master cryptographic key data, said system processor when executing said second security utility program enabling one of a system owner and an authorized user to modify said master cryptographic key data.

6. A personal computer system for receiving and retaining data and capable of securing data retained within the system against unauthorized access, the system comprising:
a keyboard for user entry of characters,
a normally closed enclosure,
a system processor mounted within said enclosure and operatively connected with said keyboard, said system processor for executing programs and processing data during operation of the personal computer system,
a read only memory (ROM) device mounted within said enclosure and operatively connected with said system processor for storing programs for operation of the personal computer system,
an interpreter program stored in said ROM device for enabling interpretation of keyboard entry of characters by a user of the personal computer system, said interpreter program being capable of interpreting beginner's all-purpose symbolic instruction code (BASIC),
said system processor when executing said interpreter program functioning in response to keyboard entry of characters by a user of the personal computer system,
a mass storage device mounted within said enclosure and inaccessible for user removal, said mass storage device having a system partition and being operatively connected with said system processor for storage of programs and data in and retrieval of programs and data from said mass storage device,
a prioritized initial loading program stored in said system partition of said mass storage device for enabling initial loading of a basic input/output system (BIOS) program from a selected one of a plurality of sources including said ROM device, said prioritized initial loading program normally designating said interpreter program as a final option default in the event of failure of access to a BIOS program from any other one of said plurality of sources,
said system processor when executing said prioritized initial loading program loading a basic input/output system program from a selected one of a plurality of sources including said ROM device,
a security utility program stored in said system partition of said mass storage device inaccessibly to either of a normal user and an unauthorized user of the personal computer system for enabling one of a system owner and an authorized user to (a) selectively modify said prioritized initial loading program by specifying the number and priority order of the group of said plurality of sources and (b) selectively modify said prioritized initial loading program by deleting said interpreter program from the group of said plurality of sources, said system processor when executing said security utility program enabling one of a system owner and an authorized user to (a) selectively modify said prioritized initial loading program by specifying the number and priority order of the group of said plurality of sources and (b) selectively modify said prioritized initial loading program by deleting said interpreter program from the group of said plurality of sources, master cryptographic key data stored in said personal computer system for use in encrypting and decrypting data processed by said system processor, and a second security utility program stored in said system partition of said mass storage device for enabling one of a system owner and an authorized user to modify said master cryptographic key data, said system processor when executing said second security utility program enabling one of a system owner and an authorized user to modify said master cryptographic key data.

7. A method of operating a personal computer system which has a keyboard for user entry of characters; a normally closed enclosure; a system processor mounted within the enclosure and operatively connected with the keyboard for executing programs and processing data during operation of the personal computer system; a read only memory (ROM) device mounted within said enclosure and operatively connected with the system processor for storing programs for operation of the personal computer system; an interpreter program stored in the ROM device for enabling interpretation of and operation of the system processor in response to keyboard entry of characters by a user of the personal computer system, the interpreter program being capable of interpreting beginner's all-purpose symbolic instruction code (BASIC); a mass storage device mounted within said enclosure and inaccessible for user removal, the mass storage device having a system partition and being operatively connected with the system processor for storage of programs and data in and retrieval of programs and data from the mass storage device; a prioritized initial loading program stored in the system partition of the mass storage device for enabling initial loading of a basic input/output system (BIOS) program from a selected one of a plurality of sources including the ROM device, the prioritized initial loading program normally designating the BASIC interpreter program as a final option default in the event of failure of access to a BIOS program from any other one of the plurality of sources; and master cryptographic key data stored in the personal computer system for use in encrypting and decrypting data processed by the system processor; a method of facilitating management of the security features of the personal computer system comprising the steps of:

executing in the system processor a first security utility program stored in the system partition of the mass storage device inaccessibly to either of a normal user and an unauthorized user of the personal computer system for enabling one of a system owner and an authorized user to (a) selectively modify the prioritized initial loading program by specifying the number and priority order of the group of the plurality of sources and (b) selectively modify the prioritized initial loading program by deleting the BASIC interpreter program from the group of the plurality of sources, and executing in the system processor a second security utility program stored in the system partition of the mass storage device for enabling one of a system owner and an authorized user to modify the master cryptographic key data.

* * * * *